G. BROWN.
COFFEE CARTRIDGE.
APPLICATION FILED MAR. 30, 1911.

1,010,721.
Patented Dec. 5, 1911.

Witnesses:
Samuel W. Balch
Frank C. Cole

Inventor,
Goodwin Brown
by Thomas Ewing Jr.,
Attorney

UNITED STATES PATENT OFFICE.

GOODWIN BROWN, OF YONKERS, NEW YORK.

COFFEE-CARTRIDGE.

1,010,721.  Specification of Letters Patent.  Patented Dec. 5, 1911.

Application filed March 30, 1911. Serial No. 617,799.

*To all whom it may concern:*

Be it known that I, GOODWIN BROWN, a citizen of the United States of America, and a resident of Yonkers, county of Westchester, and State of New York, have invented certain new and useful Improvements in Coffee-Cartridges, of which the following is a specification.

This invention relates particularly to a specially prepared coffee - percolating cartridge.

The object of my invention is to provide a percolating cartridge so constructed that the coffee is inclosed in a filter-paper shell so treated that it will serve as a hermetically sealed packing case which will not let the essential oils of the coffee escape and become absorbed by the fibers of the inclosing shell while awaiting use.

Further objects are to construct the cartridge so that it will form an effective seal against the passage of air and the escape of the aroma of the coffee.

Further objects are to so construct the cartridge that it will form an effective gasket to seal the mouth of a dripper, such for example as is set forth in United States Letters Patent No. 785,693 granted to me March 21, 1905, and also such for example as is set forth in my application for Letters Patent of the United States filed April 9, 1908, Sr. No. 425,976.

Figure 1:
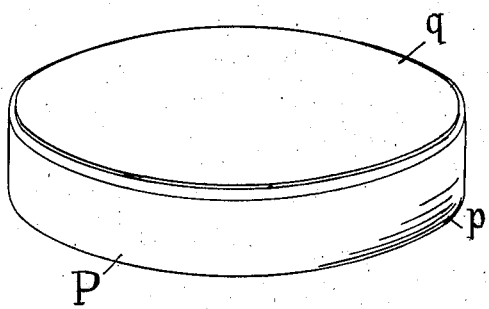
Figure 2:
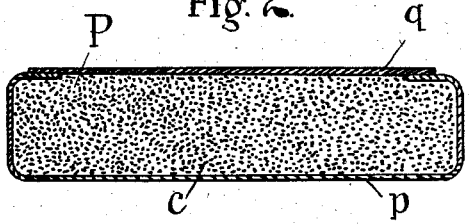

In the accompanying sheet of drawings which forms a part of this application, Figure 1 shows in perspective a percolating cartridge constructed in accordance with my invention, and Fig. 2 is a sectional view of the same.

The cartridge P is made of proper diameter and thickness to fit in the dripper with which it is intended to be used. It consists of a filter-paper shell filled with coffee which has been roasted and finely pulverized or powdered. It is preferably in the form of a round disk. One sheet of paper $p$ forms the bottom and sides and has its edges turned over the top. A second circular sheet $q$ a little smaller in diameter than the cartridge is pasted to the turned over edge of the first sheet, thereby fully inclosing the coffee. The paper, preferably before forming into the cartridge, has applied to it a non-crystallizable substance which, by reason of its non-crystallizable character, will dry and harden without cracking and preserve the paper in a perfectly non-absorbent and impervious condition. For this purpose, I find commercial glucose well suited. It is made into a thin solution and applied in any suitable way, as by means of a brush, by dipping, or running through coated rollers, and completely fills the pores of the paper. The treated paper is moistened slightly to render it pliable during the formation into cartridges. Glucose I find to be superior to any substance which I have heretofore tried by reason of the fact that it does not crystallize and thereby become broken up so as to leave the cartridge pervious to air and the volatile matter of the coffee.

What I claim as new, and desire to secure by Letters Patent of the United States, is—

1. A coffee-percolating cartridge having a filter-paper shell which is treated with a non - crystallizable substance, substantially as described.

2. A coffee-percolating cartridge having a filter-paper shell which is treated with glucose, substantially as described.

Signed by me at New York, N. Y., this 27th day of March, 1911.

GOODWIN BROWN.

Witnesses:
RICHARD J. DOYLE,
SCOTT MCLANAHAN.